July 31, 1934.   C. J. MAGALIS   1,968,497
AEROPLANE
Filed Feb. 3, 1934    3 Sheets-Sheet 1
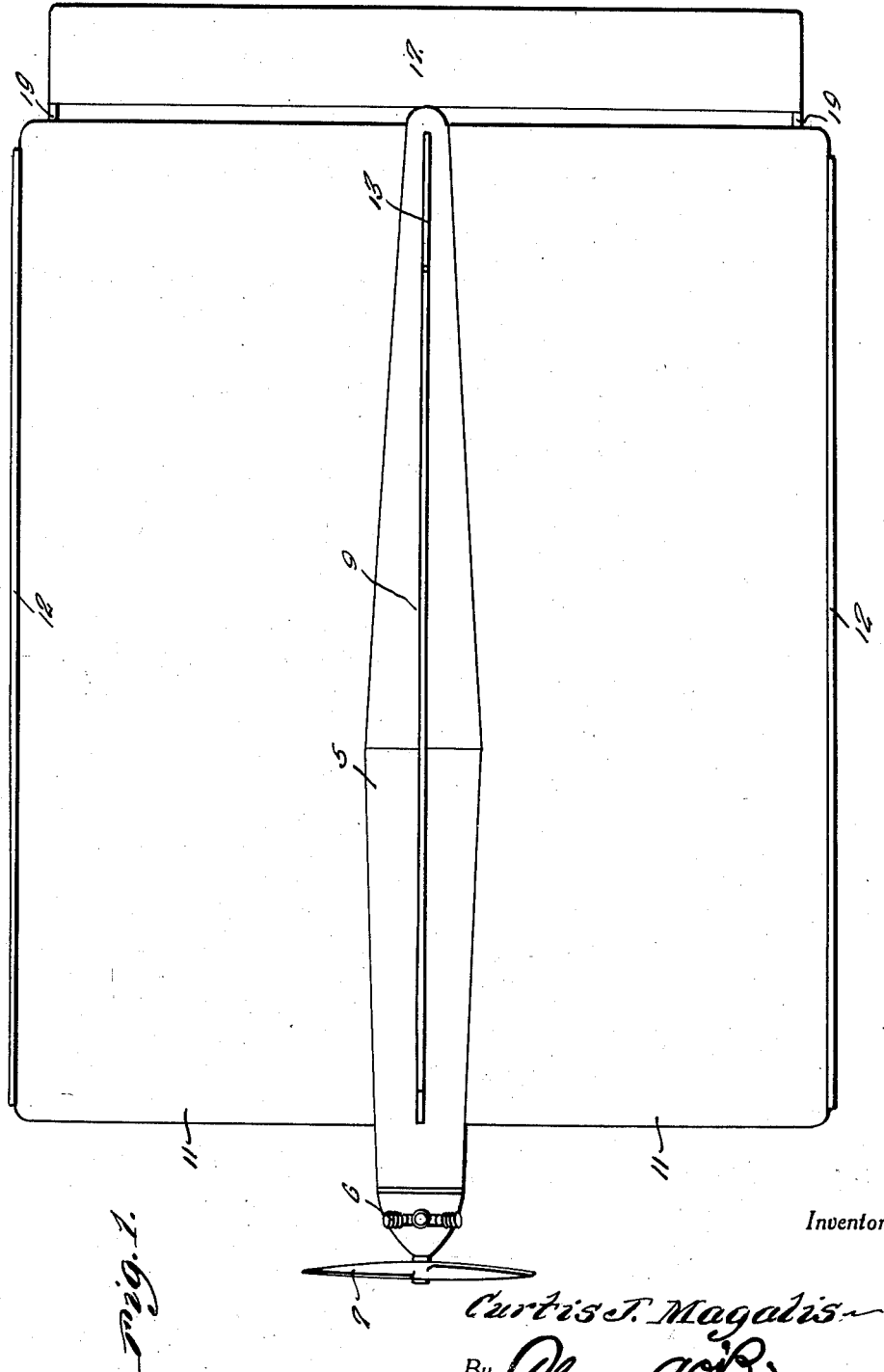
Inventor
Curtis J. Magalis
By Clarence A. O'Brien
Attorney

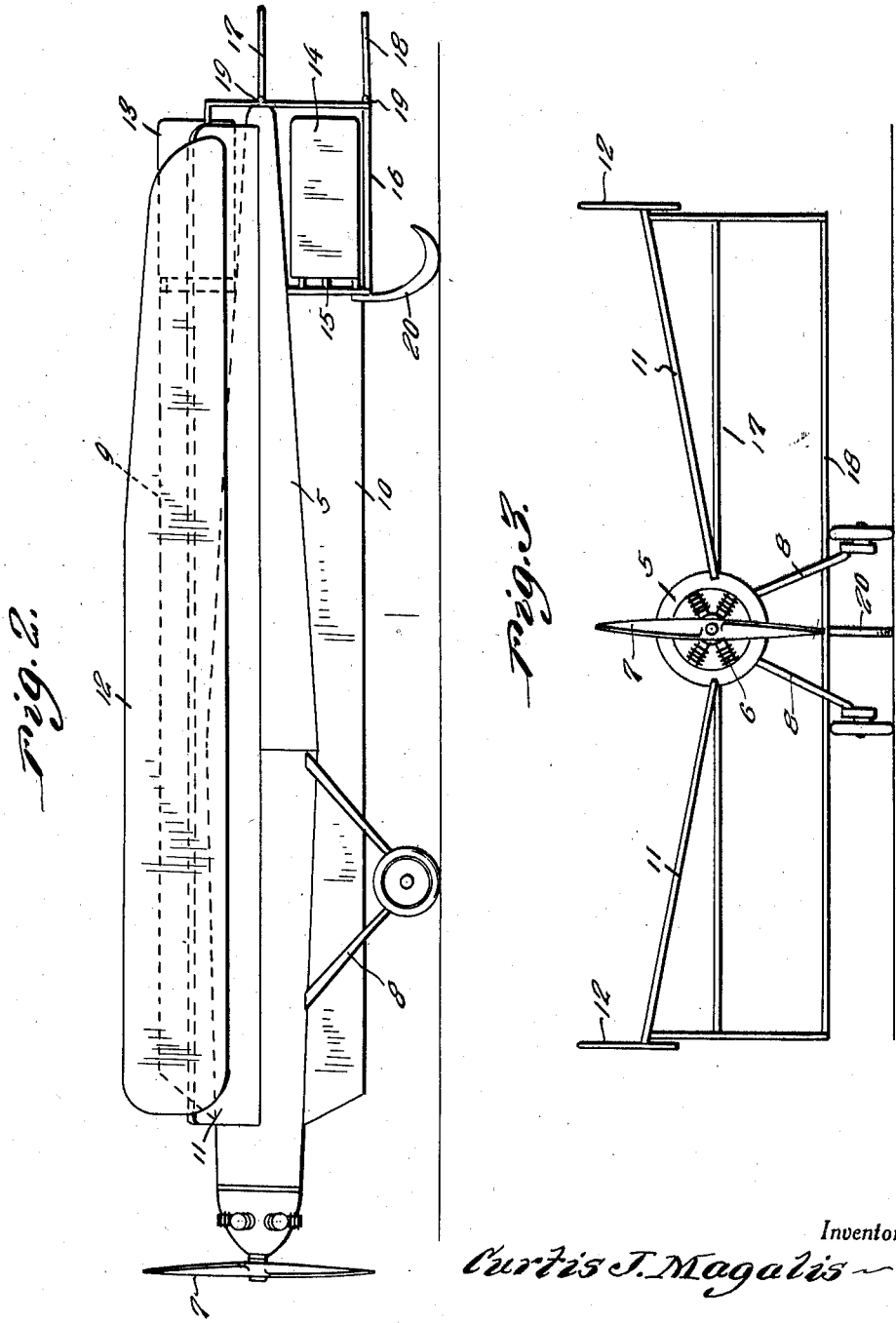

July 31, 1934. C. J. MAGALIS 1,968,497
AEROPLANE
Filed Feb. 3, 1934 3 Sheets-Sheet 3
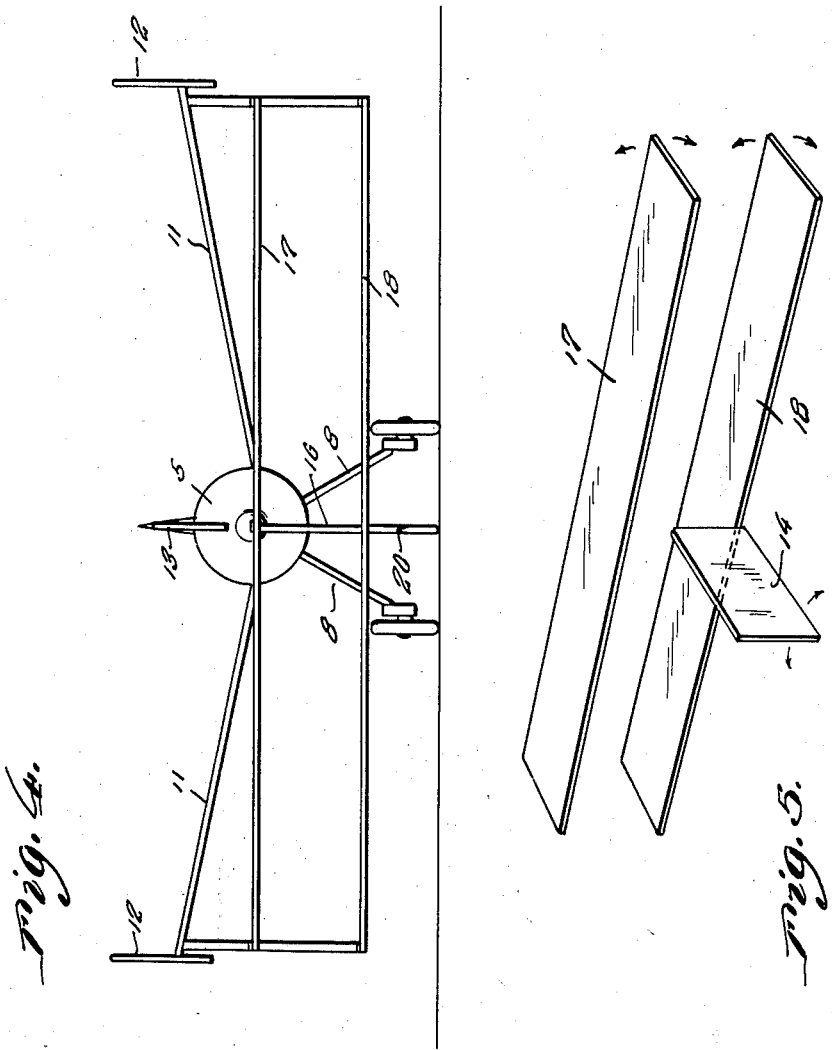
Inventor
Curtis J. Magalis
By Clarence A. O'Brien
Attorney Patented July 31, 1934

1,968,497

UNITED STATES PATENT OFFICE 1,968,497

AEROPLANE

Curtis James Magalis, McGaheysville, Va.

Application February 3, 1934, Serial No. 709,648

2 Claims. (Cl. 244—29)

This invention relates to improvements in aircrafts and has for its primary object the provision of an aeroplane having improved wing and body constructions as well as control placement.

An important feature of the invention is the provision of a wing construction which will give greater lift than previously obtained at times of ascent and descent.

A still further object of the invention is to provide an aeroplane and fuselage capable of assuming the most of the weight of the aeroplane at high speed.

A still further object of the invention is to provide an aeroplane which will be more compact, thus making the whole structure more mechanically safe.

The invention together with its objects and advantages will be best understood from a study of the following description taken in connection with the accompanying drawings wherein:

Figure 1 is a top plan view of the aeroplane.

Figure 2 is a side elevational view thereof.

Figure 3 is a front elevational view thereof.

Figure 4 is a rear elevational view and

Figure 5 is a perspective view showing the arrangement of the elevators and one of the rudders.

Referring to the drawings by reference numerals it will be seen that the aeroplane comprises a fuselage 5 which is of greatest diameter slightly forwardly of the transverse center of the fuselage and tapered in reverse direction toward the front and rear ends thereof from the point of greatest diameter. From this point of greatest diameter to the rear end thereof the taper is greater than from said point to the front end of the fuselage all of which is clearly suggested in Figure 1.

At the front thereof the fuselage is equipped in the usual manner with the prime mover 6 and driving propeller 7. A suitable landing gear 8 is also provided adjacent the forward end of the fuselage.

Extending longitudinally of the fuselage 5 at the top and bottom thereof are fins 9 and 10 respectively which are secured to the fuselage in any suitable manner and extends along the longitudinal median of the fuselage. These fins will serve to make the aeroplane more positive or stable when negotiating a turn during flight.

Sustaining planes or wings 11 project from opposite sides of the fuselage and extend longitudinally thereof for substantially the full length of the fuselage. These wings are relatively narrow being longest in the longitudinal direction of the fuselage and are also comparatively thin as shown. The wings 11 are supported at upward or outward angles of incidence, and at their outer longitudinal edges are provided with vertical relatively narrow fins attached perpendicularly to the wings and project above and below the plane of the wings. The fins mentioned, and indicated by the reference numerals 12 will serve as a balancing means and to prevent the aeroplane from slipping in negotiating a turn. In this connection it will be apparent that the thin flat inclined wings 11 will have great lifting power.

Hingedly connected to the rear end of the upper fin 9 is a rudder 13. A second rudder 14 in line with the bottom fin 10 is pivotally or hingedly mounted as at 15 within a vertical frame like structure 16 that depends from the bottom of the fuselage 5 in alinement with the fin 10.

Upper and lower elevators 17, 18 are hingedly mounted as at 19 and extend transversely of the rear of the aeroplane, the upper elevator 15 being disposed in a plane between the top and bottom of the rear portion of the fuselage 5 and the lower elevator 18 being disposed in a plane with the lower edge of the fin 10. Manifestly any suitable control means may be provided for the rudders 13 and 14 and the elevators 17 and 18.

Also secured to the frame 16 at the forward end thereof is a suitable tail skid 20.

The elevator 18 is primarily intended to be used in conjunction with the rudder 14 and will enable the pilot to have greater control of the aeroplane in ascending and descending.

In actual practice the thin flat oppositely inclined wings 11, when given the right angle of attack in relation to the air flow will have great lifting power, and upon gaining the correct altitude this angle of attack can be regulated as found desirable through the medium of the elevator 17 which elevator will of course have different stations of control to regulate different angles of attack.

Having thus described my invention, what I claim as new is:

1. In an aircraft, a fuselage having oppositely tapered end portions, perpendicular fins extending longitudinally of the fuselage along the top and bottom respectively thereof, and flat wings attached to the sides of the fuselage and supported thereby at upward angles of incidence, rudders hingedly mounted at the rear ends of said fins, and elevators hingedly mounted at the rear end of the fuselage, and including an upper elevator hinged at a point between the top and bottom surfaces of the fuselage and a lower elevator having its hinge in substantially the plane of the lower edge of the bottom fin.

2. In an aircraft including a fuselage having upper and lower longitudinal fins extending along the longitudinal median of the fuselage and sustaining planes extending laterally from opposite sides of the fuselage and lengthwise thereof; elevators hingedly mounted at the rear end of the fuselage, and including an upper elevator hinged at a point between the top and bottom surfaces of the fuselage and a lower elevator having its hinge in substantially the plane of the lower edge of the bottom fin.

CURTIS JAMES MAGALIS.